United States Patent [19]

Sugita

[11] Patent Number: 4,682,242
[45] Date of Patent: Jul. 21, 1987

[54] APPARATUS FOR IMAGE POSTURE CORRECTION

[75] Inventor: Yasutoshi Sugita, Tokyo, Japan

[73] Assignee: Canon Kabushiki Kaisha, Tokyo, Japan

[21] Appl. No.: 939,227

[22] Filed: Dec. 8, 1986

Related U.S. Application Data

[63] Continuation of Ser. No. 773,220, Sep. 6, 1985, abandoned.

[30] Foreign Application Priority Data

Oct. 1, 1984 [JP] Japan .................... 59-205977

[51] Int. Cl.⁴ .................... H04N 1/12; G03B 27/70
[52] U.S. Cl. .................... 358/285; 358/293; 355/43; 355/45
[58] Field of Search .............. 358/285, 293; 355/43, 355/45, 52, 77

[56] References Cited

U.S. PATENT DOCUMENTS

| 3,802,773 | 4/1974 | Schneider | 355/45 |
| 4,185,913 | 1/1980 | Ammann et al. | 355/43 |
| 4,219,850 | 8/1980 | Howard | 358/293 |
| 4,325,086 | 4/1982 | Sato et al. | 358/285 |

Primary Examiner—Michael A. Masinick
Attorney, Agent, or Firm—Fitzpatrick, Cella, Harper & Scinto

[57] ABSTRACT

An image reader forming an image of a recording medium on a light receiving surface of an image sensor and converts the image into an electrical signal by an image sensor, comprises a display device for displaying an inclined state of an image, a position changing device for changing a relative positional relationship between the image sensor and the image, an input device for inputting data for changing the positional relationship, and a control device for controlling the position changing device in accordance with the input data.

20 Claims, 11 Drawing Figures

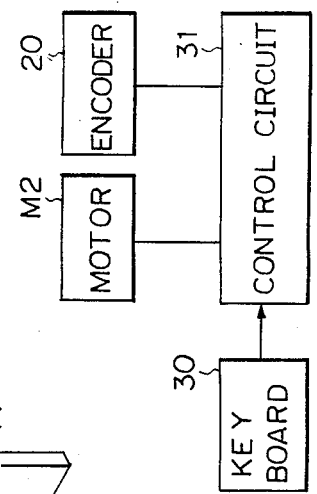
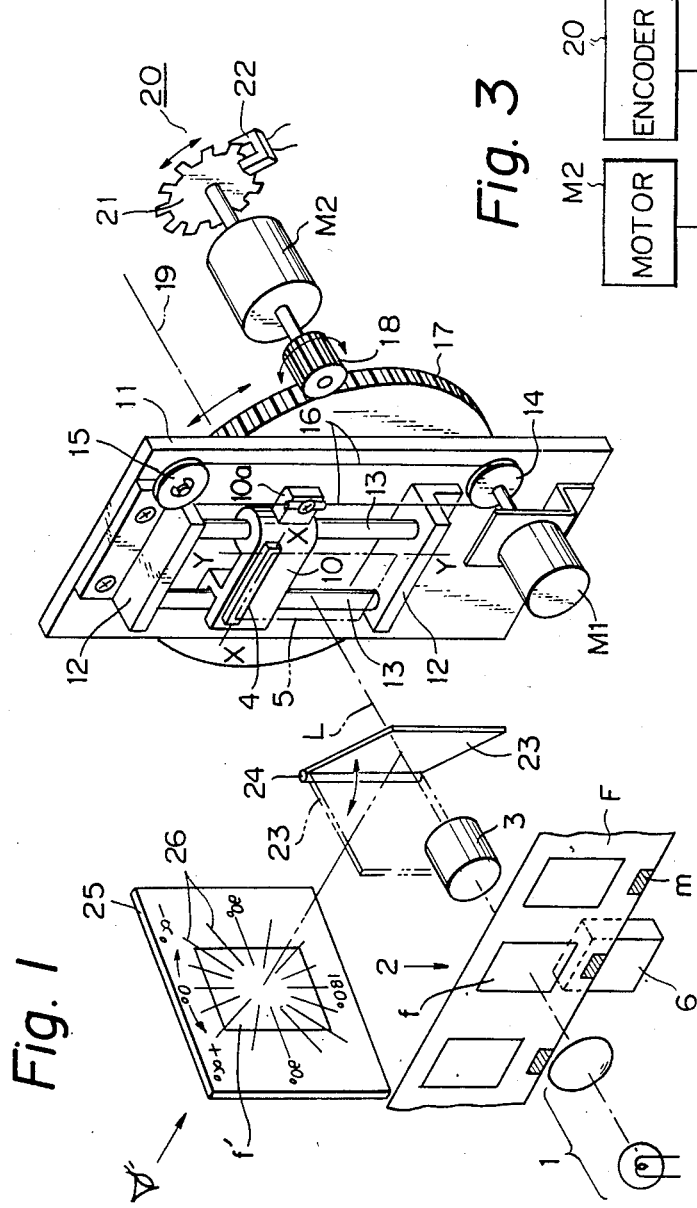

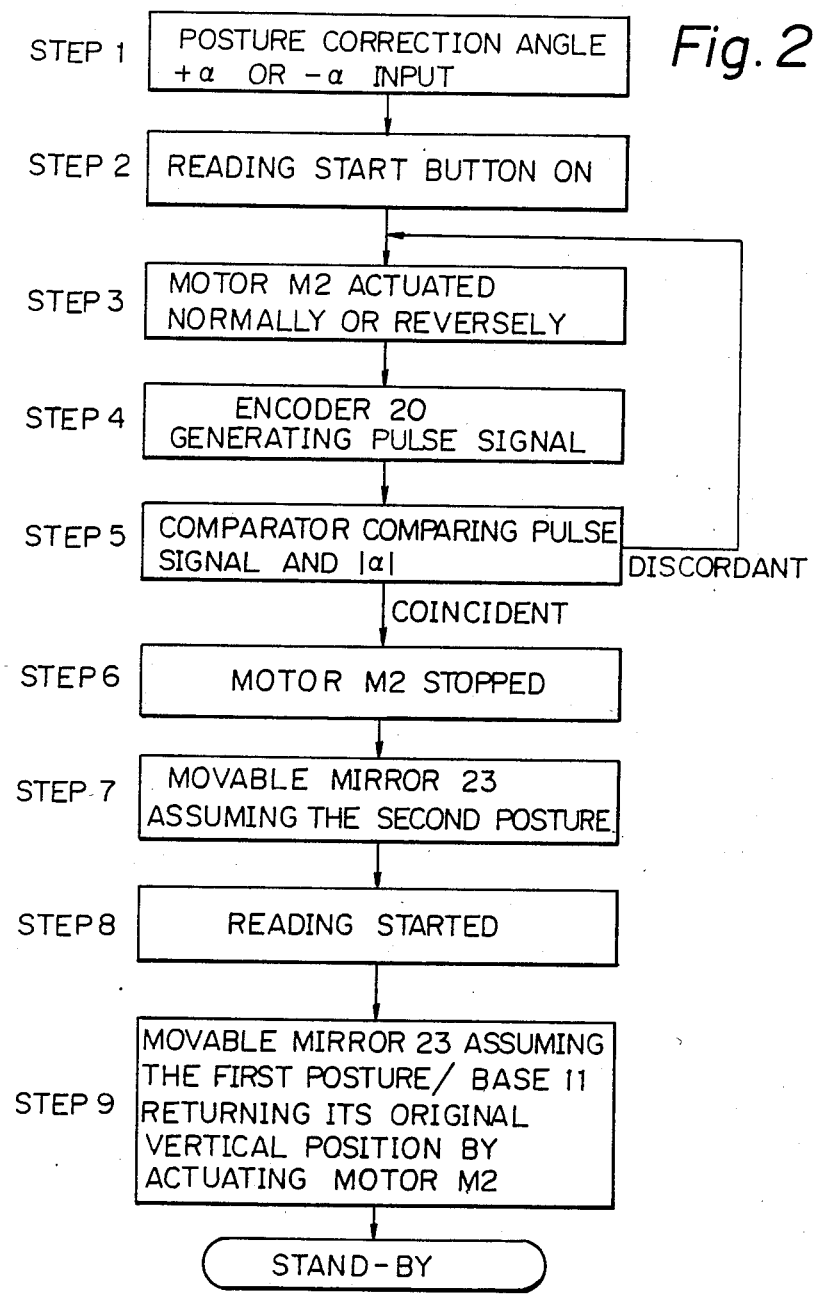

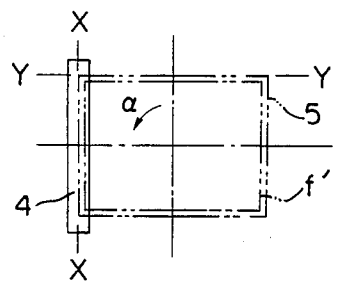
Fig. 4
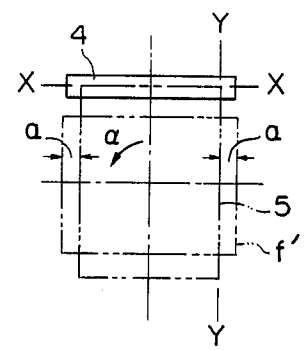
Fig. 9
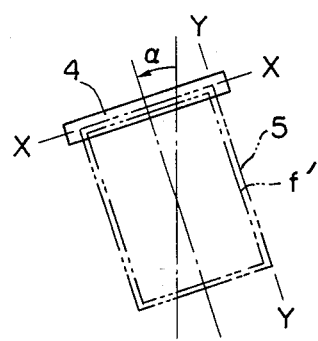
Fig. 5
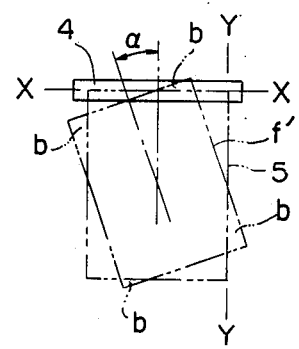
Fig. 11
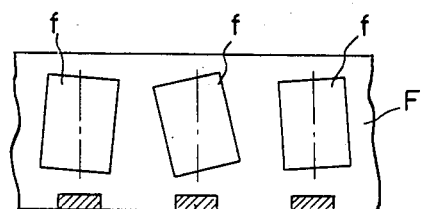
Fig. 10 (a)
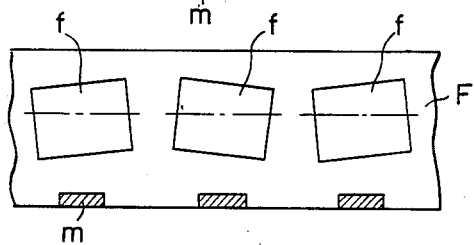
(b)

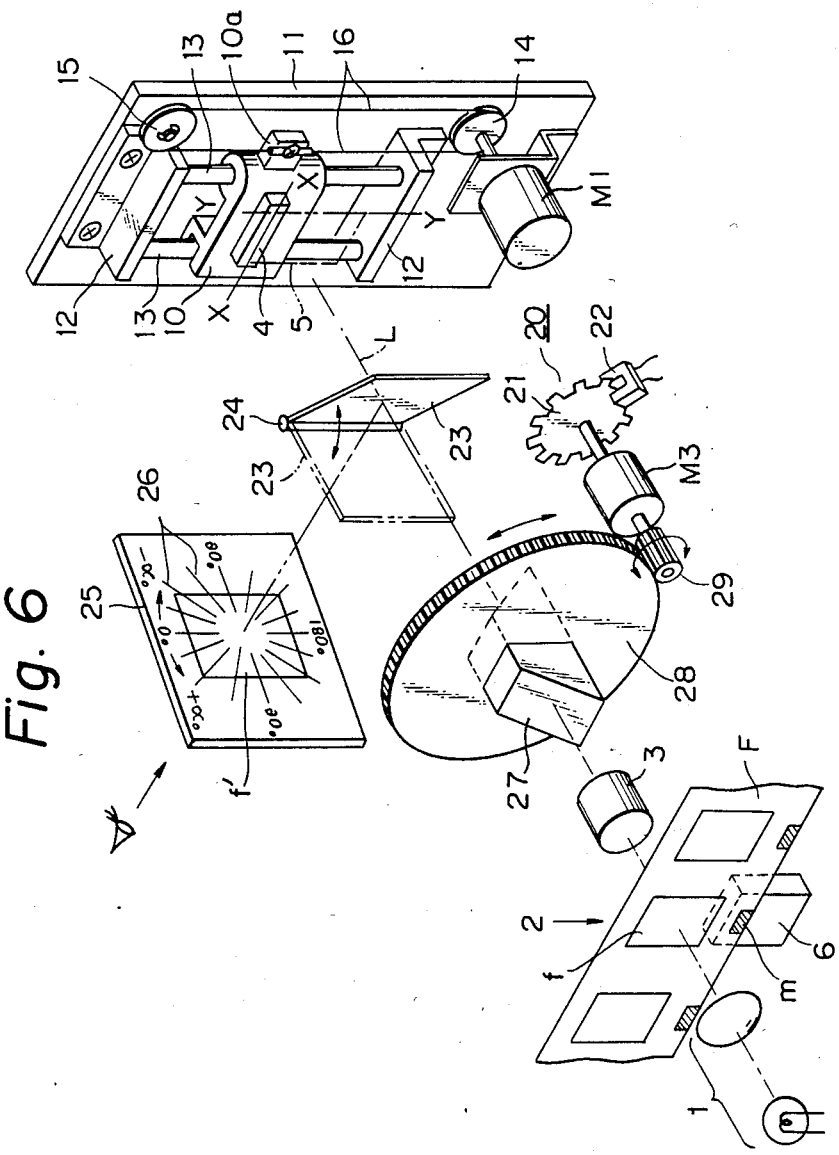

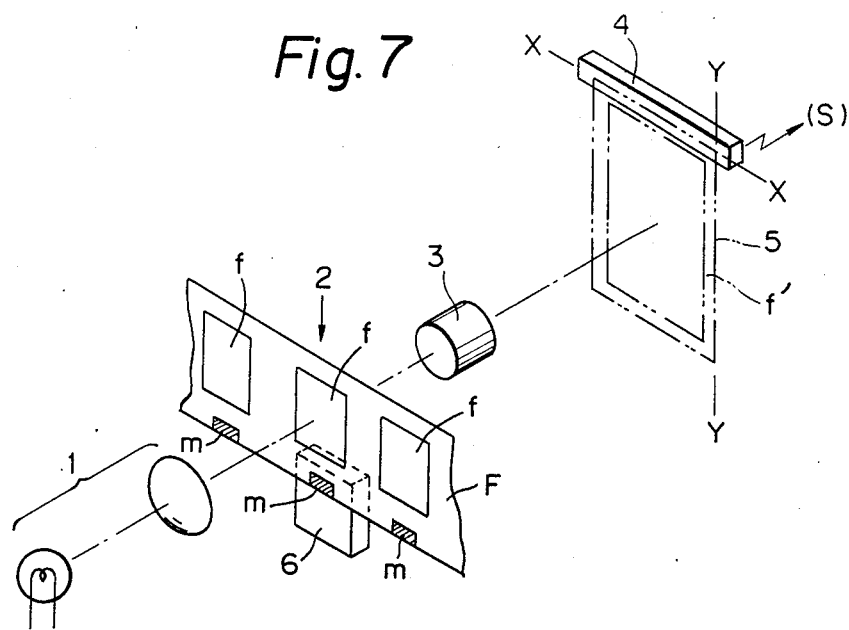
Fig. 7
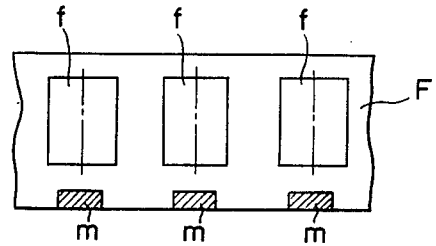
Fig. 8 (a)
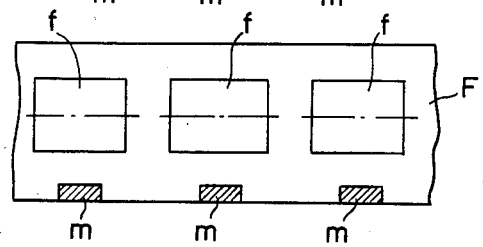
(b)

APPARATUS FOR IMAGE POSTURE CORRECTION

This application is a continuation of application Ser. No. 773,220 filed Sept. 6, 1985 now abandoned.

BACKGROUND OF THE INVENTION

1. Field of the Invention

The present invention relates to an image reader and, more particularly, to an image reader which uses a one- or two-dimensional array image sensor of a solid state imaging element such as a CCD as an image reading means, and which forms an image of a recording medium on a light-receiving region of the sensor and scans the optical image by the sensor in a main or primary scanning direction and a subscanning or secondary scanning direction so as to generate a time-serial electrical pixel signal as a reading signal.

2. Description of the Prior Art

An image reader of this type is well known as an image reader of, e.g., a microfilm.

FIG. 7 schematically shows an arrangement using a one-dimensional array image sensor.

Referring to FIG. 7, a microfilm (roll microfilm, microfiche film, microstrip film or the like) is provided at a film illuminating position 2 between a film illumination lamp device 1 and an imageing optical system 3 along an optical axis L. A horizontally arranged one-dimensional array image sensor 4 is subscanned by a drive mechanism (not shown) along a Y—Y direction as a subscanning direction perpendicular to an X—X direction as a main scanning direction. A light-receiving region 5 is defined by a main scanning length and a subscanning movement length of the sensor 4.

A frame f of the microfilm F to be read is automatically aligned at the illuminating position 2 by an automatic search mechanism. A blip mark m for searching is performed on the film F and is detected by a mark detection unit 6. Alternatively, the film F is manually aligned. The frame f at the illuminating position 2 is illuminated by the illumination lamp device 1, and an image of light transmitted through the film i.e., an image of the frame f is formed within the light-receiving region 5 of the sensor 4 by the optical system 3. The optical image f' is sequentially read from the upper to lower side by electrical main scanning along the X—X direction and mechanical subscanning movement along the Y—Y direction. Then, a time-serial electrical pixel signal S as a reading signal is generated from the sensor 4.

The output signal S is supplied to an image reproducing device or an image display device such as a printer mechanism, a facsimile receiver, a display device or the like, or a recording device or the like, thus being subjected to reproduction, display, storage and the like of an image corresponding to the original image.

An image to be read is moved with respect to the fixed one-dimensional array image sensor so as to perform subscanning (slit exposure subscanning).

When a two-dimensional array image sensor is utilized, an image of the film is formed within a two-dimensional light-receiving region, and is read by electrical main scanning and subscanning of the sensor itself, thereby similarly generating a time-serial electrical pixel signal as an image reading signal.

As for microfilms, among any of a roll microfilm, a microfiche film, a microstrip film and the like, the respective image frames f- are formed on a film surface in a vertical posture or mode, as shown in FIG. 8(a), and are formed thereon in a lateral mode, as shown in FIG. 8(b).

Th image reader shown in FIG. 7 is used for reading an image formed in the vertical mode. When the image of the film F is in the vertical mode, the optical image f' of the corresponding image frame is formed in a vertical state within the light-receiving region 5 of the sensor 4 by the optical system 3. Therefore, the main scanning and subscanning reading of the optical image f', i.e., the image frame by the sensor 4 can be sequentially performed from the upper to lower side of the vertical image. Thus, there is no problem in image display or copy by a reproducing apparatus such as a CRT display or a printer.

However, when the film F is in the lateral mode, the optical image f' of the image frame is formed by the optical system 3 laterally with respect to the light-receiving region 5 of the sensor 4, as shown in FIG. 9. As a result, the main scanning and subscanning reading of the optical image f', i.e., the image frame by the sensor 4 is performed using one long side as an upper side and the other long side as a lower side. For this reason, the following drawbacks are presented:

(1) The reproduced image on the CRT display or the printer is laterally formed, resulting in inconvenience.

(2) In many cases, since left and right side portions a of the lateral optical image f' fall outside of the light-receiving region 5, and the image in the out-of-range portions a cannot be read and reproduced, thus preventing practical use.

When images are formed on a microfilm while a posture angle of an object is inclined with respect to a camera, the image frames f are formed on the film F at the inclined posture angle, as shown in FIGS. 10(a) and 10(b).

(3) Such an image frame in an inclined posture is formed as the optical image f' on the light-receiving region 5 of the sensor 4, as shown in FIG. 11. When the inclined posture image f' is main scanned and subscanned by the sensor 4, the reproduced image is also inclined. When an inclination angle is large, portions b of the optical image f' fall outside of the reading range.

Even when the image frame f is formed on the surface of the film F in the vertical or lateral posture, if the direction of a film set in the image reader or a film holding carrier is shifted from a correct direction, the optical image f' of the image frame f is inclined with respect to the light-receiving region 5 of the sensor 4 as shown in FIG. 11.

The drawbacks (1), (2) and (3) are common to an image reader for performing slit exposure subscanning processing by moving an image of a film with respect to a fixed one-dimensional array image sensor and to an image reader using a two-dimensional array image sensor when a microfilm having image frames in the vertical mode is used in an image reader for reading image frames in the lateral mode.

SUMMARY OF THE INVENTION

It is an object of the present invention to provide an image reader free from the above drawbacks (1), (2) and (3).

According to the present invention, an image reader which forms an image of a recording medium on a light receiving surface of an image sensor and converts the image into an electrical signal by an image sensor, comprises a display means for displaying an inclined state of an image; a position changing means for changing a relative positional relationship between the image sensor and the image; an input means for inputting data for changing the positional relationship; and a control means for controlling the position changing means in accordance with the input data.

BRIEF DESCRIPTION OF THE DRAWINGS

FIG. 1 is a perspective view of a main part of an image reader according to a first embodiment of the present invention;

FIG. 2 is a flow chart;

FIG. 3 is a block diagram showing a control system;

FIGS. 4 and 5 are views showing states wherein a light-receiving surface of an image sensor is pivoted so as to align it with a lateral image and an inclined image;

FIG. 6 is a perspective view of a main part of an image reader according to a second embodiment;

FIG. 7 is a schematic perspective view of an image reader for a microfilm using a one-dimensional array image sensor;

FIGS. 8(a) and (b) are views partially showing microfilms in the vertical and lateral modes;

FIG. 9 is a view showing a state wherein an image to be read is laterally formed on the light-receiving surface of the sensor to be inclined at 90° with respect thereto;

FIGS. 10(a) and (b) are views partially showing microfilms on which image frames are formed to be inclined; and FIG. 11 is a view showing a state wherein an image to be read is performed on the light receiving surface of the sensor to be inclined at a certain angle with respect thereto.

DETAILED DESCRIPTION OF THE PREFERRED EMBODIMENTS

An embodiment of the present invention will be described hereinafter.

First Embodiment (FIG. 1)

In this embodiment, an image reader turns a light-receiving region 5 of a sensor 4 in accordance with a posture angle α of an optical image f'.

A carrier 10 has a one-dimensional array image sensor 4 as an image reading sensor. The carrier 10 is slidable along a pair of right and left guide rails 13 in the subscanning direction. The rails 13 are vertically supported parallel to each other on a vertical base 11 through brackets 12.

A driving pulley 14 and a driven pulley 15 are disposed at lower and upper sides of the base 11. An endless wire 16 is looped between the pulleys 14 and 15, and a portion of the wire 16 is coupled to a lug 10a which extends from the side of the carrier 10. The driving pulley 14 is rotated by a normal/reverse motor M1 in normal/reverse directions. When the driving pulley 14 is actuated in the normal direction, the wire 16 is pivoted counterclockwise, and the carrier 10 of the one-dimensional array image sensor 4 is moved downward along the rails 13, i.e., in the subscanning direction Y—Y. In contrast to this, when the driving pulley 14 is actuated in the reverse direction, the carrier 10 is moved upward along the rails 13. The carrier 10 is normally held at an upper end position of the rails 13 as a home position.

The base 11 mounting the sensor 4, the carrier 10, and its subscanning mechanism components 12 to 16 and M1 is supported to be freely pivotal about a pivot shaft 19 (indicated by an axis) coaxial with an optical axis L of an imaging optical system 3.

A large gear 17 is mounted on a back surface of the base 11 to be coaxial with the supporting shaft 19, and a small gear 18 meshed with the large gear 17 is driven by a normal/reverse motor M2. When the motor M2 is driven in the normal or reverse direction, the base 11 is pivoted counterclockwise or clockwise about the supporting shaft 19 through the small and large gears 18 and 17. Upon pivotal movement of the base 11, the light-receiving region 5 of the sensor 4 is turned about the optical axis L.

An encoder 20 is directly connected to an output shaft of the motor M2 so as to generate a pulse signal corresponding to a rotational angle of the output shaft. The encoder 20 is constituted by a rotating disk 21 having slits for pulse generation and a transmission type photosensor 22.

A movable mirror 23 is interposed between the optical system 3 and the sensor 4, and can be selectively switched about a shaft 24 by a switching mechanism (not shown) to a first posture in which the mirror 23 crosses the optical axis L at 45° with respect thereto, as indicated by a solid line, and a second posture in which the mirror 23 is moved sideway from the optical axis L, as indicated by alternate long and two dashed lines. An image f' of an image frame f to be read is formed on an image monitor screen 25 when the movable mirror 23 is held in the first posture, and is formed on the light-receiving region 5 of the sensor 4 when the movable mirror 23 is held in the second posture.

Normally the base 11 is held in a vertical posture, as indicated by the solid line, and the movable mirror 23 is held in the first posture. In this state, the image f' of the image frame f to be read at the illuminating position 2 is formed on the screen 25.

Therefore, when the posture of the image f' on the screen 25 is observed, the movable mirror 23 is switched to the second posture so that the image f' is formed on the light-receiving region 5 of the sensor 4. In this case, the following conditions can be easily discriminated:

(a) Whether or not the image f' falls within the light-receiving region 5 of the sensor 4 in a normal posture.

(b) Whether or not the image f' is in an inclined posture (including a 90° lateral state and a 180° reversed state), and to what extent the image f' is inclined (inclination angle α).

A scale 26 is drawn on the screen surface so as to determine an inclination angle.

In the case of (a), since there is no problem, a reading start button (not shown) on an operation panel of the image reader is depressed. Then, the mirror 23 is switched to the second posture, and the image f' of the image frame f to be read is formed within the light-receiving region 5 of the sensor 4. In response to a switching end signal indicating that the movable mirror 23 has been switched to the second posture, main scanning and subscanning of the image f' is executed by the sensor 4. The movable mirror 23 is held in the first posture in response to a reading end signal.

In the case of (b), the operation shown in FIG. 2 is required.

(Step 1) An inclination angle α of the image f' with respect to the light-receiving region 5 of the sensor 4 determined by the monitor screen 25 is inputted as a posture correction angle to a control circuit 31 (inputted to a comparator of the control circuit) by, e.g., a keyboard 30 (FIG. 3) as an input means provided on an operation panel. In this case, when the image f' is inclined to the left with respect to the light-receiving region 5 of the sensor 4, the posture correction angle α is given by +α, and when inclined to the right, it is given by −α.

(Step 2) The reading start button is turned ON.

(Step 3) The motor M2 is driven by a motor control circuit of the control circuit 31. In this case, when the posture correction angle α is +α, the motor is actuated in the normal direction, and the base 11 is rotated counterclockwise. That is, the light-receiving region 5 of the sensor 4 is turned to the left about the optical axis L of the optical system 3. In contrast to this, when the angle α is −α, the motor M2 is actuated in the reverse direction, the base 11 is rotated clockwise, and the light-receiving region 5 of the sensor 4 is turned to the right.

(Step 4) Pulse signals proportional in number to the normal or reverse rotational angle of the motor M2, i.e., pulse signals proportional in number to the rotational angle of the base 11 are generated by the encoder 20 upon driving of the motor M2, and are supplied to the comparator of the control circuit 31.

(Step 5) A count of accumulated angle input pulses is compared with the posture correction angle |α| which is inputted in advance in step 1.

(Step 6) When the pulse count accumulated angle coincides with |α|, the motor M2 is stopped. Thus, the light-receiving region 5 of the sensor 4 is inclined substantially at the inclination angle α of the image f' so as to oppose the image f' in the inclined posture.

(Step 7) In accordance with the drive stop signal of the motor M2, the movable mirror 23 is switched to the second posture, and the image f' normally falls within the light-receiving region 5 of the sensor 4 which is turned in the inclined posture corresponding to the inclination angle α of the image f'.

(Step 8) The main scanning and subscanning of the image f' is executed by the sensor 4.

(Step 9) In response to the reading end signal, the movable mirror 23 is returned to the first posture, and the motor M2 is driven in the normal or reverse direction so as to return the base 11 to the original vertical posture. Then, the image reader is switched to the stand-by state.

Second Embodiment (FIG. 6)

In this embodiment, the optical image f' is turned with respect to a light-receiving region 5 of a sensor 4 so as to change its posture. The same reference numerals in the second embodiment denote the same parts as in the first embodiment, and a detailed description thereof will be omitted.

An image rotating prism 27 as an image rotating optical member is inserted between an imaging optical system 3 and a movable mirror 23. A large gear 28 holds the prism 27 at its center, and a small gear 29 meshed with the large gear 28 is rotated by a normal/reverse motor M3. When the motor M3 is rotated in the normal or reverse direction, the large gear 28 is rotated counterclockwise or clockwise so as to pivot the prism 27 to the left or right about an optical axis L. When the prism 27 is rotated, and optical image f' to be formed on a surface of a screen 25 or the light-receiving region 5 of the sensor 4 is turned in accordance with the rotational angle of the prism 27 so as to change the posture of the image.

In the image reader of this embodiment, the prism 27 is pivoted to the left or right about the optical axis L in accordance with a posture correction angle ±α supplied to a control circuit 31, and the posture of the image f' is corrected to the normal posture with respect to the light-receiving region 5 of the sensor 4, thus reading an image.

According to the present invention, an optical image f' of an image frame f to be read formed on a light-receiving region of an image sensor can be observed in advance by a display means, and an inclination angle can be determined when the image is formed in an inclined posture (including a 90° lateral state and a 180° reverse state). When the inclination angle falls outside of an allowable range, an inclined posture angle α is inputted as posture correction data, a relative posture between the image sensor and the image to be read is changed in accordance with the input data, and the optical image f' is allowed to fall within the light-receiving region of the image sensor in a normal posture, thus overcoming the above-mentioned conventional drawbacks (1) to (3).

What I claim is:

1. An apparatus for correcting a posture of an image comprising:
    an image sensor;
    optical means for projecting an image onto said image sensor;
    monitoring means for monitoring the image projected by said optical means;
    correction means for relatively correcting an error of posture of the projected image relative to said image sensor;
    input menas for inputting a value corresponding to a deflection of the image monitored by said monitoring means with respect to a reference position; and
    control means for controlling said correcting means in response to the input value so as to cause the posture of the image projected onto said image sensor to become appropriately corrected.

2. An apparatus according to claim 1, wherein said monitoring means comprises a screen for monitoring the posture of the image projected onto said image senosr, said screen comprising a scale.

3. An apparatus according to claim 1, wherein said correcting means comprises support means for rotatably supporting image sensor and drive means for rotating said support means.

4. An apparatus according to claim 1, wherein said correcting means comprises image rotating means for rotating the projected image about an axis parallel to an optical axis thereof.

5. An apparatus according to claim 4, wherein said image rotating means comprises a rotatable prism provided in an optical path of said optical means, and drive means for rotating said prism.

6. An apparatus according to claim 4, wherein said image rotating means comprises support means for rotatably supporting a recording medium recording the image, and drive means for rotating said support means.

7. An image reader according to claim 1, wherein said display means has a screen of which the image is formed, and said screen has a scale indicating an inclination angle of the image.

8. An image reader according to claim 7, further comprising optical path switching means for selectively switching an optical path for forming an image on said image sensor and an optical path for orming the image on said screen.

9. An apparatus according to claim 1, wherein said input means comprises a key board for inputtting the value for correcting the posture of the projected image into a regular condition.

10. An image reader according to claim 1, wherein said image sensor has a number of one-dimensionally arranged imaging elements.

11. An image reader according to claim 1, wherein said image sensor has a number of two-diemensionally arranged imaging elements.

12. An apparatus according to claim 1, wherein said image is recorded on microfilm.

13. An apparatus for correcting a posture of an image comprising:
 an imaging surface;
 a screen having a reference scale;
 optical means for selectively projecting an image onto either said imaging surface or said screen;
 correcting means for relatively correcting an error of posture of the projected image relative to a predetermined region of said imaging surface;
 input means for inputting a correction value determined on the basis of a relative position of the posture of the image projected onto said screen relative to said reference scale; and
 control means for controlling said correcting means in response to the input value on the input means so as to cause the posture of the image projected onto said imaging surface to become appropriately corrected.

14. An apparatus according to claim 13, wherein said correcting means comprises support means for rotatably supporting photo-electric conversion means, and drive means for rotatiang said support means.

15. An apparatus according to claim 13, wherein said correcting means comprises image rotating means for rotating the projected image about an axis parallel to an optical axis thereof.

16. An apparatus according to claim 15, wherein said image rotating means comprises a rotatable prism provided in an optical path of said optical means, and drive means for rotating said prism.

17. An apparatus according to claim 15, wherein said image rotating means comprises a support member for rotatably supporting an image supporting member, and drive means for rotating said support member.

18. An image reproducing apparatus in which an image of an original is read by photoelectric conversion means to be converted into an electrical signal, and the read image is either recorded on a recording medium or displayed on a displaying portion on the basis of said electric signal, said apparatus comprising:
 first optical means for projecting the image onto the photoelectric conversion means;
 a scale plate having an inclination mark;
 second optical means for directing the image projected by said first optical means to said scale plate;
 input means for inputting a position correction value determined on the basis of a relative position of the image projected onto said scale plate to said indication mark;
 correcting means for relatively correcting an error of posture of the image projected onto said photoelectric conversion means; and
 control means for controlling said correcting means in response to the input value on said input means so as to cause a relative position of the projected image relative to said photoelectric conversion means to become appropriately corrected.

19. A recording apparatus for projecting an image of an original onto an imaging surface and recording the thus projected image on a record medium, comprising:
 optical means for projecting the image of the original onto the imaging surface and a screen;
 image rotating means for rotating the projected image about an axis parallel to an optical axis;
 input means for inputting data corresponding to orientation of the image projected onto the screen; and
 image rotation control means for driving said image rotating means such that image on the imaging surface is oriented in a predetermined direction on the basis of the data input via said input means.

20. An apparatus accoridng to claim 19, wherein said image rotating means may rotate the projected image by a desired angle.

* * * * *